(12) United States Patent
Liu et al.

(10) Patent No.: US 12,013,049 B2
(45) Date of Patent: Jun. 18, 2024

(54) CONCENTRATED WATER REGULATING VALVE

(71) Applicant: Nanjing Hanshu Environmental Protection Equipment Co., Ltd., Nanjing (CN)

(72) Inventors: Guo Liu, Nanjing (CN); Xiaohan Liu, Nanjing (CN)

(73) Assignee: Nanjing Hanshu Environmental Protection Equipment Co., Ltd., Nanjing (CN)

( * ) Notice: Subject to any disclaimer, the term of this patent is extended or adjusted under 35 U.S.C. 154(b) by 0 days.

(21) Appl. No.: 18/187,704

(22) Filed: Mar. 22, 2023

(65) Prior Publication Data

US 2023/0258270 A1 Aug. 17, 2023

Related U.S. Application Data

(63) Continuation of application No. PCT/CN2021/130143, filed on Nov. 11, 2021.

(30) Foreign Application Priority Data

Nov. 23, 2020 (CN) .......................... 202011317964.0

(51) Int. Cl.
  *F16K 3/08* (2006.01)
  *F16K 3/30* (2006.01)
  (Continued)

(52) U.S. Cl.
  CPC .................. *F16K 3/08* (2013.01); *F16K 3/30* (2013.01); *F16K 5/12* (2013.01); *F16K 27/045* (2013.01); *F16K 31/041* (2013.01); *F16K 31/60* (2013.01)

(58) Field of Classification Search
  USPC ........................................................ 251/208
  See application file for complete search history.

(56) References Cited

U.S. PATENT DOCUMENTS 4,887,793 A * 12/1989 Hernandez ................ F16K 3/34
  251/304
5,107,884 A * 4/1992 Orlandi ..................... F16K 3/08
  251/304

(Continued)

FOREIGN PATENT DOCUMENTS

| CN | 107998888 A | 5/2018 |
| CN | 207470894 U | 6/2018 |

(Continued)

OTHER PUBLICATIONS

Internation Search Report of PCT/CN2021/130143, Mailed Jan. 26, 2022.

*Primary Examiner* — John Bastianelli

(57) ABSTRACT

The utility model provides a water purification machine with adjustable discharge capacity. The water purification machine with the adjustable discharge capacity comprises a water purification tank, a water storage tank and a controller, the device comprises a first treatment cylinder, a second treatment cylinder and a third treatment cylinder, the bottom of the first treatment cylinder communicates with a first branch pipe, the other end of the first branch pipe communicates with the bottom of the second treatment cylinder, the top of the second treatment cylinder communicates with a second branch pipe, and the other end of the second branch pipe communicates with the interior of the third treatment cylinder; one end of the raw water inlet pipe is communicated with the top of the first treatment cylinder; and the top end of the first drainage pipe communicates with the bottom of the third treatment cylinder, and the other end of the first drainage pipe communicates with a booster pump. The water (Continued)

purification machine with the adjustable discharge capacity can be adjusted according to specific conditions, not only has an energy-saving function, but also is beneficial to environmental protection, ensures that water resources are utilized to the maximum extent, and ensures that the service life of the water purification machine is longer.

12 Claims, 2 Drawing Sheets

(51) Int. Cl.
*F16K 5/12* (2006.01)
*F16K 27/04* (2006.01)
*F16K 31/04* (2006.01)
*F16K 31/60* (2006.01)

(56) References Cited

U.S. PATENT DOCUMENTS

| | | | |
|---|---|---|---|
| 5,217,046 A * | 6/1993 | Woods | F16K 27/045 |
| | | | 137/625.3 |
| 6,171,481 B1 * | 1/2001 | Walfridsson | B01D 29/606 |
| | | | 210/136 |
| 8,016,264 B2 * | 9/2011 | Takemasa | A61M 16/10 |
| | | | 128/205.24 |
| 2015/0285385 A1 * | 10/2015 | Tuineag | F16K 3/32 |
| | | | 251/304 |

FOREIGN PATENT DOCUMENTS

| | | |
|---|---|---|
| CN | 108317268 A | 7/2018 |
| CN | 209781718 U | 12/2019 |
| CN | 209815820 U | 12/2019 |
| JP | 2001276815 A | 10/2001 |

* cited by examiner

CONCENTRATED WATER REGULATING VALVE

CROSS-REFERENCE TO RELATED APPLICATIONS

This application is a continuation of International Patent Application No. PCT/CN2021/130143 with a filing date of Nov. 11, 2021, designating the United States, now pending, and further claims priority to Chinese Patent Application No. 202011317964.0 with a filing date of Nov. 23, 2020. The content of the aforementioned applications, including any intervening amendments thereto, are incorporated herein by reference.

TECHNICAL FIELD

The disclosure relates to the technical field of water purification, in particular to a concentrated water regulating valve.

BACKGROUND ART

A water purification system (which is configured to treat raw water such as tap water into drinking water that meets human drinking standards) may be connected with a concentrated water regulating valve, which is configured to receive concentrated water from the water purification system and distribute the concentrated water in proportion so that one part of the concentrated water can be returned to the water purification system to participate in utilization and the other part of the concentrated water is discharged.

In related art, a hole series is formed in a concentrated water regulating valve, and opening of the hole series is controlled by a spool to further regulate a distribution ratio of the concentrated water.

However, because it is easy for the concentrated water entering the concentrated water regulating valve to scale, which easily block holes in the hole series, especially ends of the holes, such as an end of a hole with a smallest aperture, thus resulting in change in a concentrated water distribution ratio for the concentrated water regulating valve and even blockage of the whole concentrated water regulating valve, and eventually affecting operation of the water purification system and quality of the drinking water.

SUMMARY

Problems to be Solved

In view of above technical problems existing in the related art, a concentrated water regulating valve is provided in an embodiment of the disclosure.

Solution

In order to solve the above technical problems, a technical scheme adopted by the embodiment of the disclosure is as follows.

A concentrated water regulating valve includes:

a valve body having a water inlet, a water outlet and a discharge port, a valve cavity being formed inside the valve body;

a partition component provided in the valve body and configured to divide the valve cavity into a first cavity and a second cavity, the partition component being provided with a hole series communicating the first cavity with the second cavity, and the water inlet and the water outlet being communicated with the first cavity, and the discharge port being communicated with the second cavity; and a spool arranged in the second cavity for changing a flow section of the hole series.

The first cavity is provided to be a cylindrical cavity.

At least the water inlet extends to the first cavity in a tangential direction, so that the concentrated water flows rotationally after entering the first cavity through the water inlet.

Preferably, both the water inlet and the water outlet extend to the first cavity in the tangential direction.

An orientation of the water outlet is opposite to a flying-off direction of the concentrated water flowing rotationally in the first cavity.

Preferably, the orientation of the water outlet is opposite to an orientation of the water inlet.

Preferably, both the water inlet and the water outlet is formed to be constricting ports in a section communicating with the first cavity.

Preferably, the partition component is a sheath-like component, and a valve disc is formed at an end of the sheath-like component located in the first cavity. The hole series is arranged on the valve disc.

The spool is arranged in the sheath-like component to change the flow section of the hole series through rotation.

Preferably, the second cavity is provided to be a cylindrical cavity, and a stepped structure is defined between the second cavity and the first cavity. An outer periphery of the sheath-like component is formed with an annular step for matching with the stepped structure.

Preferably, a surface of the valve disc in the first cavity is a plane.

Preferably, a surface of the valve disc in the first cavity is a surface with a raised middle region, and the hole series is located at a radial periphery of the middle region.

Preferably, the hole series includes a plurality of through holes circumferentially arranged.

Preferably, the hole series is an arc-shaped through groove extending in a circumferential direction and gradually changing in cross section.

Preferably, an end of the spool facing the valve disc is provided with an end slot, and an overlapping area of the end slot and the hole series defines the flow section of the hole series.

Preferably, the end slot is communicated to the second cavity by means of a guide channel.

The guide channel includes:

an annular flow guiding groove provided at a periphery of the spool, the end slot extending axially to be communicated to the annular flow guiding groove; and a flow guiding channel, one end of which extends to an inner wall of the sheath-like component and corresponds to the annular flow guiding groove, and the other end of which extends to an end face of the spool facing the second cavity.

Preferably, a section of the flow guiding channel proximate to the second cavity forms a bell mouth.

Preferably, the spool is defined in the sheath-like component by means of a sleeving retaining ring.

Preferably, the spool is driven by a knob mechanism.

The knob mechanism includes:

a shaft system, an inner end of which extends into the second cavity and is connected to the spool, and an outer end of the shaft system is located outside the valve body; and a knob connected to the outer end of the shaft system.

Preferably, the shaft system includes:

a gear column connected to the spool, the gear column being matched with the valve body by a spring jacking ball; and a shaft, an inner end of which is inserted into and keyed with the gear column, the knob being connected to an outer end of the shaft.

Preferably, the spool is made of a ceramic material.

Beneficial Effects

Compared with the related art, the concentrated water regulating valve according to the disclosure has following beneficial effects.

By extending the water inlet to the first cavity in the tangential direction, the hole series can be continuously flushed to a great extent, and then the hole series can be effectively prevented from being blocked due to crystallization, especially an end of the hole series with a small orifice can be prevented from being blocked.

It is to be understood that both foregoing general description and following detailed description are only exemplary and illustrative and are not intended to limiting the disclosure.

Summary of various implementations or examples of the technology described in this disclosure is not a comprehensive disclosure of a full scope or all features of the disclosed technology.

BRIEF DESCRIPTION OF THE DRAWINGS

In the drawings, which are not necessarily drawn to scale, same reference numerals may describe similar components in different views. Same reference numerals with letter suffixes or different letter suffixes may indicate different examples of similar components. The drawings generally illustrate various embodiments by way of example and not limitation, and together with the description and claims, serve to explain the disclosed embodiments. Where appropriate, the same reference numerals are used throughout the drawings to refer to the same or similar components. Such embodiments are illustrative and are not intended to be exhaustive or exclusive embodiments of the present apparatus or method.

REFERENCE NUMERALS

10—Valve Body; 11—First Cavity; 12—Second Cavity; 13—End Cover; 21—Water Inlet; 211—Constricting Port; 22—Water Outlet; 221—Constricting Port; 23—Discharge Port; 30—Sleeve-like Component; 31—Valve Disc; 311—Bulge; 32—Flow Guiding Channel; 40—Spool; 41—End Slot; 42—Annular Flow Guiding Groove; 50—Hole Series; 60—Knob Mechanism; 61—Gear Column; 62—Shaft; 63—Knob; 64—Spring Jacking Ball.

DETAILED DESCRIPTION

In order to make objects, technical schemes and advantages of the embodiments of the present disclosure more clear, the technical schemes in the embodiments of the present disclosure will be described clearly and completely in combination with the drawings in the embodiments of the present disclosure. Obviously, the described embodiments are some, but not all, of the embodiments of the present disclosure. On a basis of the described embodiments in this disclosure, all other embodiments obtained by the ordinary skilled in the art without any creative effort are within the protection scope of this disclosure.

unless otherwise defined, technical terms or scientific terms used in this disclosure shall have a general meaning understood by those with general skills in the field to which this disclosure pertains. Words "first", "second" and the like used in this disclosure do not indicate any order, quantity or importance, but are only used to distinguish different components. Similar words such as "including" or "containing" mean that the elements or objects appearing before the words encompass listed elements or objects appearing after the word and their equivalents, with other elements or objects being not excluded. Similar words such as "connected to" or "connected with" are not limited to physical or mechanical connection, but can include electrical connection, direct or indirect. An expression such as "upper", "lower", "left" and "right" is only used to express a relative positional relationship. When an absolute position of a described object changes, the relative positional relationship may also change accordingly.

In order to keep following description of embodiments of the present disclosure clear and concise, detailed descriptions of known functions and known components are omitted.

A concentrated water regulating valve is disclosed in an embodiment of the disclosure, which is connected to a water purification system for distributing concentrated water flowing out of the water purification system in proportion, so that one part of concentrated water passing through the concentrated water regulating valve flows back to the water purification system to participate in preparation of drinking water, and the other part of the concentrated water is directly discharged.

Figure 1:
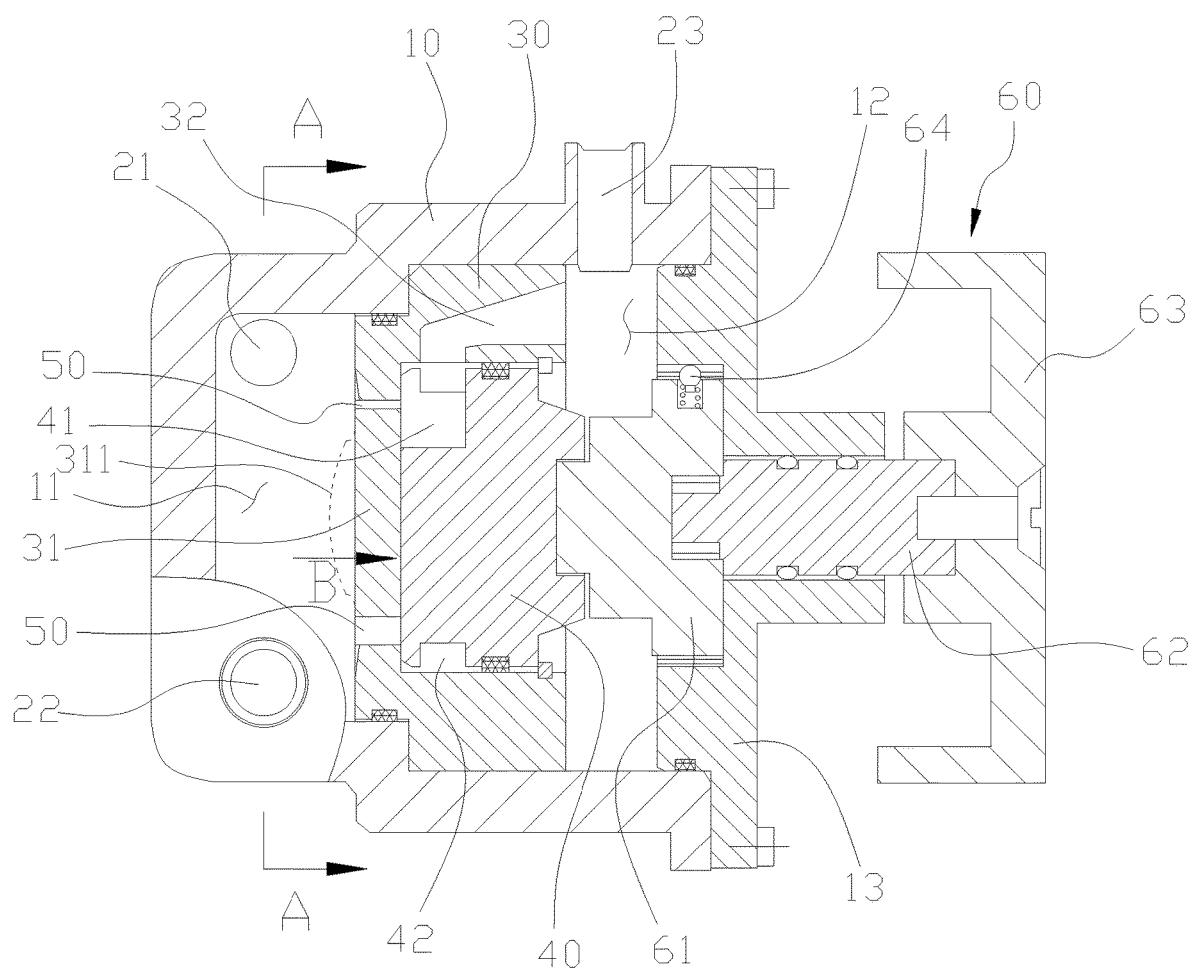
FIG. 1 is a schematic diagram of an internal structure of a concentrated water regulating valve according to an embodiment of the present disclosure.
Figure 2:
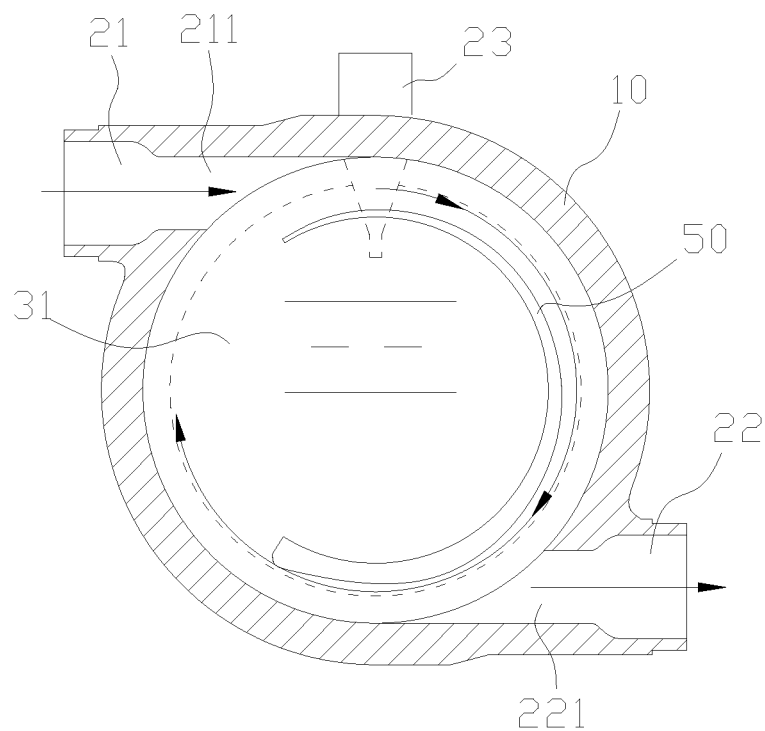
FIG. 2 is a sectional view taken along a line A-A of FIG. 1.
Figure 3:
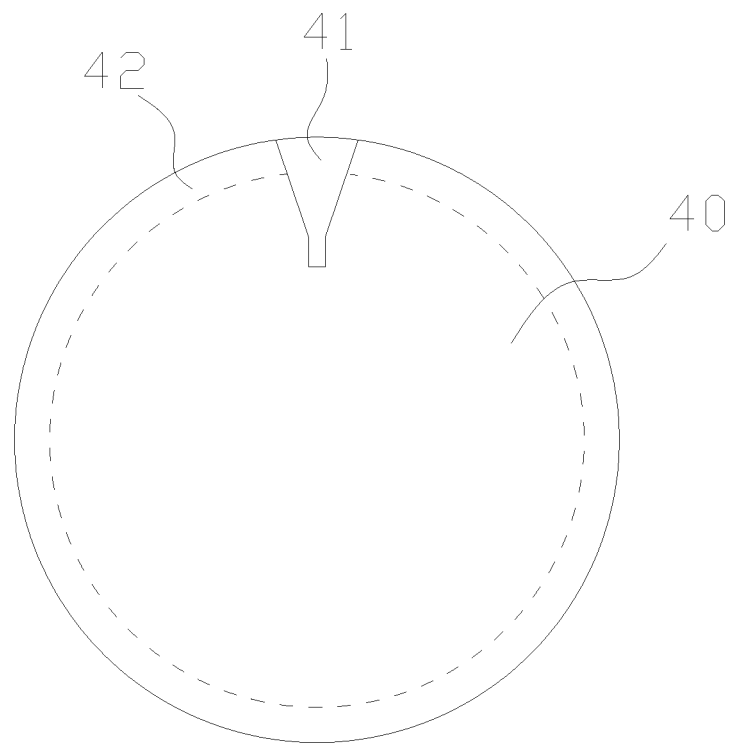
FIG. 3 is a sectional view along a B direction of FIG. 1.

As shown in FIGS. 1 to 3, the concentrated water regulating valve includes a valve body 10, a partition component, a spool 40 and a driving mechanism.

A valve cavity is formed inside the valve body 10, and an end of the valve body 10 is opened, and the partition component is loaded into the valve cavity from an open side, and the open side is blocked by means of an end cover 13. The partition component divides the valve cavity into a first cavity 11 (the first cavity 11 is located on a left side of the partition component shown in FIG. 1) and a second cavity 12 (the second cavity 12 is located on a right side of the partition shown in FIG. 1).

The partition component is provided with a hole series 50, and both ends of the hole series 50 are respectively communicated with the first cavity 11 and the second cavity 12. The spool 40 is arranged in the second cavity 12, and a flow section of the hole series 50 is changed by rotating the spool 40.

A water inlet 21 and a water outlet 22 are formed at axial positions on the valve body 10 corresponding to the first cavity 11, and both the water inlet 21 and the water outlet 22 are communicated with the first cavity 11. A water discharge port is provided at axial positions on the valve body 10 corresponding to the second cavity 12, and the water outlet is communicated with the second cavity 12.

The water inlet 21 is configured to be communicated with a concentrated water outlet of the water purification system, and the water outlet 22 is configured to be communicated with a concentrated water return port of the water purification system. In this way, the concentrated water flowing out of the water purification system enters the first cavity 11 through the water inlet 21, one part of the concentrated water entering the first cavity 11 flows back to the water purification system through the water outlet 22 and the concentrated water return port of the water purification system to participate in preparation of drinking water, while the other part of the concentrated water enters the second cavity 12 through the hole series 50 and is discharged through the water discharge port. Further, the spool 40 is driven to rotate by the driving mechanism to regulate the flow section of the hole series 50, so that a flow of concentrated water passing through the hole series 50 can be regulated, and a ratio of the concentrated water discharged from the water outlet 22 to the concentrated water discharged from the water discharge port can be changed.

A key of this embodiment is that the first cavity 11 is provided to be a flat cylindrical cavity, that is, an inner wall of the first cavity 11 encloses a flat cylindrical surface, and it is important that the water inlet 21 extends to the first cavity 11 in a tangential direction.

With above structural features of the first cavity 11 and the water inlet 21:

after the concentrated water enters the first cavity 11 through the water inlet 21, the concentrated water flows rotationally in the first cavity 11 at a certain flow rate, which makes loss of energy (kinetic energy) of the concentrated water in the first cavity 11 small, so that the inner wall of the first cavity 11 and an end face of the partition component facing the first cavity 11 are continuously flushed by the rotating concentrated water, which can effectively prevent the concentrated water from crystallizing at the inner wall of the first cavity 11 and the end face of the partition component, especially crystallization at an end of the hole series 50 can be prevented to a greater extent.

In addition, a tangential force generated by rotational flowing of the concentrated water also has a great flushing effect on inside of the hole series 50.

In addition, because the concentrated water flows rotationally in the first cavity 11, time for the concentrated water in the first cavity 11 is prolonged, so that flushing effect of a unit amount of concentrated water on relevant surfaces in the first cavity 11 is fully utilized.

It can be seen based on the above that the concentrated water regulating valve according to this embodiment has following advantages.

By extending the water inlet 21 to the first cavity 11 in the tangential direction, the hole series 50 can be continuously flushed to a great extent, and then the hole series 50 can be effectively prevented from being blocked due to crystallization, especially an end of the hole series 50 with a small orifice can be prevented from being blocked.

In some more preferred embodiments, as shown in FIG. 2, the water outlet 22 also extends to the first cavity 11 in the tangential direction, but an orientation of the water outlet 22 is opposite to a flying-off direction of the concentrated water flowing rotationally in the first cavity 11. Advantages of this arrangement are that if an extending direction of the water inlet 21 is the same as or at a certain angle with the flying-off direction of the concentrated water flowing rotationally in the first cavity 11 the concentrated water flowing rotationally may be subjected to great shear force when passing through the water outlet 22, which results in disorder of a concentrated water flow and cause energy loss. However, an orientation of the water inlet 21 is opposite to the flying-off direction of the concentrated water flowing rotationally, so that resistance (including the shear force) to which the concentrated water passing through the water inlet 21 is subjected is very small, with small energy loss, which makes the concentrated water continuously flow rotationally in the first cavity 11 to a certain extent, and further improves flushing effect of the concentrated water on respective cavity walls in the first cavity 11.

In some more preferred embodiments, the orientation of the water outlet 22 is opposite to the orientation of the water inlet 21. That is, the water inlet 21 is located at a top as shown in FIG. 2, and the water outlet 22 is located at a bottom as shown in FIG. 1. In this way, all of the concentrated water entering the first cavity 11 travels through at least a half arc flow stroke, thereby reducing energy loss of the concentrated water to a greater extent.

The hole series 50 can have various structural forms, and two specific structural forms of the hole series 50 are illustrated in the following:

a first structural form (not shown in the drawings), in which the hole series 50 includes a plurality of through holes communicated with the partition component, the plurality of through holes are circumferentially arranged and with apertures changed sequentially. Correspondingly, the spool 40 is configured to change the flow section of the hole series 50 by opening through holes with different apertures and closing remaining through holes, thereby changing a ratio of concentrated water flowing out of the water outlet 22 and concentrated water flowing out of the discharge port 23.

a second structural form, in which, as shown in FIG. 2, the hole series 50 is an arc-shaped through groove extending in a circumferential direction and gradually changing in cross section. The spool 40 is configured to change the flow section of the hole series 50 by opening different sections of the arc-shaped through groove and closing other areas, thereby changing the ratio of concentrated water flowing out of the water outlet 22 and concentrated water flowing out of the discharge port 23.

In some more preferred embodiments, both the water inlet 21 and the water outlet 22 is formed to be a constricting port 211 in a section communicating with the first cavity 11. Advantages of this arrangement are that a flow rate of the concentrated water entering the first cavity 11 is increased by providing the contraction port 211, thus improving flushing effect of the concentrated water on respective cavity walls of the first cavity 11.

The partition component has various structures. In some more preferred embodiments, the partition component is a sheath-like component 30, which is formed with a valve disc 31 at an end of the first cavity 11. The hole series 50 is formed on the valve disc 31. The spool 40 is mounted in the sheath-like component 30, and the spool 40 can be made of a ceramic material. The sheath-like component 30 is sealed with the valve body 10 by a sealing ring, and rotation of the sheath-like component 30 can be restricted by a key structure or interference fit. The sheath-like component 30 is internally provided with a sleeving retaining ring for limiting the spool 40 from being detached from the sheath-like component 30. Advantages of configuring the partition component structure to be the sheath-like component 30 and forming above-described assembly relationship between the spool 40 and the sheath-like component 30 are that assembly compactness can be improved to a great extent.

In some more preferred embodiments, the second cavity 12 is provided to be a cylindrical cavity, and a stepped structure is defined between the second cavity 12 and the first cavity 11. An outer periphery of the sheath-like component 30 is formed with an annular step for matching with the stepped structure. In this way, assembly and positioning of the sheath-like component 30 are facilitated.

A surface of the valve disc 31 facing the first cavity 11 may be flat or a surface with a bulge 311 at its middle. When the middle of the surface of the valve disc 31 is provided with the bulge 311, the hole series 50 is arranged at a radial periphery of the bulge 311. In this way, most of the concentrated water flows along the radial periphery of the bulge 311, so that the flow rate of the concentrated water can be increased, with a better flushing effect on the hole series 50.

The concentrated water flowing through the hole series 50 can flow toward the second cavity 12 by means of various structural forms. In some more preferred embodiments, as shown in FIGS. 1 to 3, an outer edge of the spool 40 facing an end face of the valve disc 31 is provided with an end slot 41. A guide channel is formed between the end slot 41 and the second cavity 12. The guide channel includes an annular flow guiding groove 42 provided on an outer peripheral surface of the spool 40 and a flow guiding channel 32 provided on the sheath-like component 30. The end slot 41 extends axially to be communicated to the annular flow guiding groove 42. One end of the flow guiding channel 32 is communicated to an inner wall of the sheath-like component 30 and is axially opposite to the annular flow guiding groove 42, while the other end of the flow guiding channel 32 is communicated to an end face of the sheath-like component 30 located at the second cavity 12. In this way, the concentrated water flowing through the hole series 50 sequentially passes through the end slot 41, the annular flow guiding groove 42 and the flow guiding channel 32, enters the second cavity 12, and is discharged through the discharge port 23. Moreover, by rotating the spool 40, an overlapping area between the end slot 41 and the hole series 50 can be changed, thus changing a flow section defining the concentrated water flow.

In some more preferred embodiments, a sectional area of the end slot 41 is made larger than a sectional area of the hole series 50 corresponding to the end face, which enables a flow rate of the concentrated water flowing through the hole series 50 to be decreased after it enters the end slot 41, which may inevitably reduce impact of the concentrated water on related components, and thus reduce noise and vibration.

In some more preferred embodiments, a section of the flow guiding channel 32 proximate to the second cavity 12 forms a bell mouth. This also decreases the flow rate of the concentrated water flowing through the flow guiding channel 32, thereby reducing noise and vibration to some extent.

The driving mechanism can be configured to drive the spool 40 in various ways, for example, the driving mechanism can be configured to drive the spool 40 with a servo motor.

In a preferred embodiment, as shown in FIG. 1, a knob 63 mechanism 60 can be selected as the driving mechanism. The knob 63 mechanism 60 includes a shaft system and a knob 63. The shaft system includes a gear column 61 and a shaft 62. Specifically, a head of the gear column 61 is connected to the spool 40 through splines, and a spring jacking ball 64 is provided between an outer periphery of the gear column 61 and the end cover 13. A head of the shaft 62 is defined through the end cover 13 and connected to a tail of the gear column 61, and two sealing rings are provided between the shaft 62 and the end cover 13. The knob 63 is connected to a tail of the shaft 62. In this way, the spool 40 can be driven to rotate by screwing the knob 63.

Language-Dependent Free Text

Furthermore, although exemplary embodiments have been described in the present disclosure, any and all embodiments based on the present disclosure with equivalent elements, modifications, omissions, combinations (e.g., schemes where various embodiments intersect), adaptations or changes are included in its scope. Elements in the claims are to be broadly interpreted based on the language adopted in the claims, and are not limited to examples described in this specification or during implementation of this application, and their examples are to be interpreted as non-exclusive. Therefore, the specification and examples are intended to be considered as examples only, with true scope and spirit indicated by following claims along with their full scope of equivalents.

The above description is intended to be illustrative rather than limiting. For example, above examples (or one or more schemes thereof) can be used in combination with each other. For example, other embodiments may be used by those skilled in the art upon reading the above description. In addition, in above specific embodiments, various features can be grouped together to simplify the present disclosure. This should not be interpreted as an intention that an unclaimed disclosed feature is essential to any claim. On the contrary, the subject matter of the disclosure may be less than all features of a particular disclosed embodiment. Thus, following claims are incorporated into the detailed description herein as examples or embodiments, wherein each claim is independently as a separate embodiment, and these embodiments can be considered to be combined with each other in various combinations or permutations. Scope of the present disclosure should be determined with reference to the appended claims along with a full range of equivalents to which these claims are entitled.

Above embodiments are only exemplary embodiments of the present disclosure, and are not intended to limit the present disclosure. Protection scope of the present disclosure is defined by claims. Various modifications or equivalent substitutions can be made by those skilled in the art within spirit and protection scope of the disclosure, which should also be regarded as falling within the protection scope of the disclosure.

The invention claimed is:

1. A concentrated water regulating valve, comprising:
a valve body having a water inlet, a water outlet and a discharge port, a valve cavity, being formed inside the valve body;
a partition component provided in the valve body and configured to divide the valve cavity into a first cavity and a second cavity, the partition component being provided with a hole series communicating the first cavity with the second cavity, and the water inlet and the water outlet being communicated with the first cavity, and the discharge port being communicated with the second cavity; and
a spool arranged in the second cavity for changing a flow section of the hole series; wherein
the first cavity is provided to be a cylindrical cavity; and
at least the water inlet extends to the first cavity in a tangential direction, so that concentrated water flows rotationally after entering the first cavity through the water inlet.

2. The concentrated water regulating valve according to claim 1, wherein both the water inlet and the water outlet extend to the first cavity in the tangential direction; and an orientation of the water outlet is opposite to a flying-off direction of the concentrated water flowing rotationally in the first cavity.

3. The concentrated water regulating valve according to claim 2, wherein the orientation of the water outlet is opposite to an orientation of the water inlet.

4. The concentrated water regulating valve according to claim 1, wherein both the water inlet and the water outlet is formed to be constricting ports in a section communicating with the first cavity.

5. The concentrated water regulating valve according to claim 1, wherein the partition component is a sheath-like component, and a valve disc is formed at an end of the sheath-like component located in the first cavity; the hole series is arranged on the valve disc; and the spool is arranged in the sheath-like component to change the flow section of the hole series through rotation.

6. The concentrated water regulating valve according to claim 5, wherein the second cavity is provided to be a cylindrical cavity, and a stepped structure is defined between the second cavity and the first cavity; and an outer periphery of the sheath-like component is formed with an annular step for matching with the stepped structure.

7. The concentrated water regulating valve according to claim 5, wherein a surface of the valve disc in the first cavity is a plane.

8. The concentrated water regulating valve according to claim 5, wherein a surface of the valve disc in the first cavity is a surface with a raised middle region, and the hole series is located at a radial periphery of the middle region.

9. The concentrated water regulating valve according to claim 5, wherein an end of the spool facing the valve disc is provided with an end slot, an overlapping area of the end slot and the hole series defining the flow section of the hole series.

10. The concentrated water regulating valve according to claim 9, wherein the end slot is communicated to the second cavity by means of a guide channel; wherein
the guide channel comprises:
an annular flow guiding groove provided at a periphery of the spool, the end slot extending axially to be communicated to the annular flow guiding groove; and
a flow guiding channel, one end of which extends to an inner wall of the sheath-like component and corresponds to the annular flow guiding groove, and the other end of which extends to an end face of the spool facing the second cavity.

11. The concentrated water regulating valve according to claim 1, wherein the hole series comprises a plurality of through holes circumferentially arranged.

12. The concentrated water regulating valve according to claim 1, wherein the hole series is an arc-shaped through groove extending in a circumferential direction and gradually changing in cross section.

* * * * *